US012694176B2

(12) United States Patent
Chen et al.

(10) Patent No.: US 12,694,176 B2
(45) Date of Patent: Jul. 28, 2026

(54) DEVICE AND METHOD FOR SEMICONDUCTOR CHIP ASSISTANCE DESIGN AND METHOD FOR CONSTRUCTING CHIP CHARACTERISTICS MODEL

(71) Applicant: DigWise Technology Corporation, LTD, Hsinchu County (TW)

(72) Inventors: Shih-Hao Chen, Hsinchu County (TW); Chen-Hsiang Kao, Hsinchu County (TW)

(73) Assignee: DigWise Technology Corporation, LTD, Hsinchu County (TW)

( * ) Notice: Subject to any disclaimer, the term of this patent is extended or adjusted under 35 U.S.C. 154(b) by 805 days.

(21) Appl. No.: 18/168,574

(22) Filed: Feb. 14, 2023

(65) Prior Publication Data

US 2024/0213103 A1     Jun. 27, 2024

(30) Foreign Application Priority Data

Dec. 27, 2022    (TW) .................................. 111150090

(51) Int. Cl.
*G06F 30/27*        (2020.01)
*G06F 30/398*        (2020.01)
(Continued)

(52) U.S. Cl.
CPC ............ *G06F 30/27* (2020.01); *G06F 30/398* (2020.01); *H10P 74/277* (2026.01); *G06F 2119/18* (2020.01); *G06N 3/094* (2023.01)

(58) Field of Classification Search
None
See application file for complete search history.

(56) References Cited

U.S. PATENT DOCUMENTS 7,243,316 B2 *  7/2007  White ............... H01L 21/31053
                                                       257/E21.244
9,129,237 B2 *  9/2015  Leu .................. G06Q 10/06395
                (Continued)

FOREIGN PATENT DOCUMENTS

TW        201329760        7/2013
TW        202041852        11/2020
                (Continued)

OTHER PUBLICATIONS

I.J. Goodfellow et al., "Generative Adversarial Nets," arXiv:1406. 2661v1, Jun. 10, 2014, 9 pages. (Year: 2014).*
                (Continued)

*Primary Examiner* — Leigh M Garbowski
(74) *Attorney, Agent, or Firm* — JCIPRNET

(57)        ABSTRACT

A chip-assisted design device and a method for constructing a chip characteristic distribution model. The apparatus includes a database and a processor. The database has a first chip characteristic distribution image data generated based on a wafer fabrication process data of a current process, wherein the first chip characteristic distribution image data represents a gradient distribution of at least one chip characteristic in one of the wafers produced through current fabrication process. The processor is coupled to the database. A second chip characteristic image data generated based on the first chip characteristic image data is used as a reference data for predicting the future wafer fabrication process, and the reference data is provided to the current fabrication process to evaluate or correct the first chip characteristic image.

34 Claims, 17 Drawing Sheets

(51) Int. Cl.
 G06N 3/094  (2023.01)
 H10P 74/00  (2026.01)
 *G06F 119/18*  (2020.01)

(56)    References Cited

U.S. PATENT DOCUMENTS

| | | | | |
|---|---|---|---|---|
| 10,930,597 B2 * | 2/2021 | Lim | ....................... | G06T 7/0004 |
| 11,880,643 B2 * | 1/2024 | Chen | ................... | G06F 30/3315 |
| 2009/0167339 A1 * | 7/2009 | Marshall | ............ | G01R 31/3025 |
| | | | | 324/754.29 |
| 2013/0173041 A1 * | 7/2013 | Leu | ................. | G06Q 10/06395 |
| | | | | 700/105 |
| 2018/0330493 A1 * | 11/2018 | Milligan | .............. | G06N 3/0409 |
| 2022/0011728 A1 * | 1/2022 | Zhang | .................. | G05B 13/027 |
| 2022/0318672 A1 * | 10/2022 | Qu | ........................ | G06N 3/088 |
| 2022/0374573 A1 * | 11/2022 | Chen | ................... | G06F 30/3315 |

FOREIGN PATENT DOCUMENTS

| | | |
|---|---|---|
| TW | 202244797 | 11/2022 |
| TW | 202247021 | 12/2022 |

OTHER PUBLICATIONS

"Office Action of Taiwan Counterpart Application", issued on Jan. 17, 2024, p. 1-p. 10.

* cited by examiner

DEVICE AND METHOD FOR SEMICONDUCTOR CHIP ASSISTANCE DESIGN AND METHOD FOR CONSTRUCTING CHIP CHARACTERISTICS MODEL

CROSS-REFERENCE TO RELATED APPLICATION

This application claims the priority benefit of Taiwan application serial no. 111150090, filed on Dec. 27, 2022. The entirety of the above-mentioned patent application is hereby incorporated by reference herein and made a part of this specification.

BACKGROUND

The disclosure relates to an integrated chip-assisted design technique and, in particular, to an integrated chip-assisted design device and a method for constructing a chip characteristic model.

In general, a wafer produced by an integrated circuit process is non-uniform. That is, IC chips on different locations in the same wafer have different chip characteristics distribution, non-uniform chip characteristics are mainly caused by process systematic defects. Existing IC chip-assisted design techniques do not take into account the uniformity of chip characteristics caused by process systematic defects in each production line. Such process systematic defects may include rotational vibration, non-uniform rotational grinding, substrate tilting, non-uniform spraying, litho-effect, etc. As a result of process system defects, the die (also known as bare die) at a specific location on the wafer may have non-uniform distribution of chip characteristics. Process systemic defects are usually generated on the substrates in the fabrication process, and therefore cannot be predicted at the present circuit design stage.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The disclosure provides device and method for semiconductor chip assistance design and method for constructing chip characteristics model.

Figure 1:
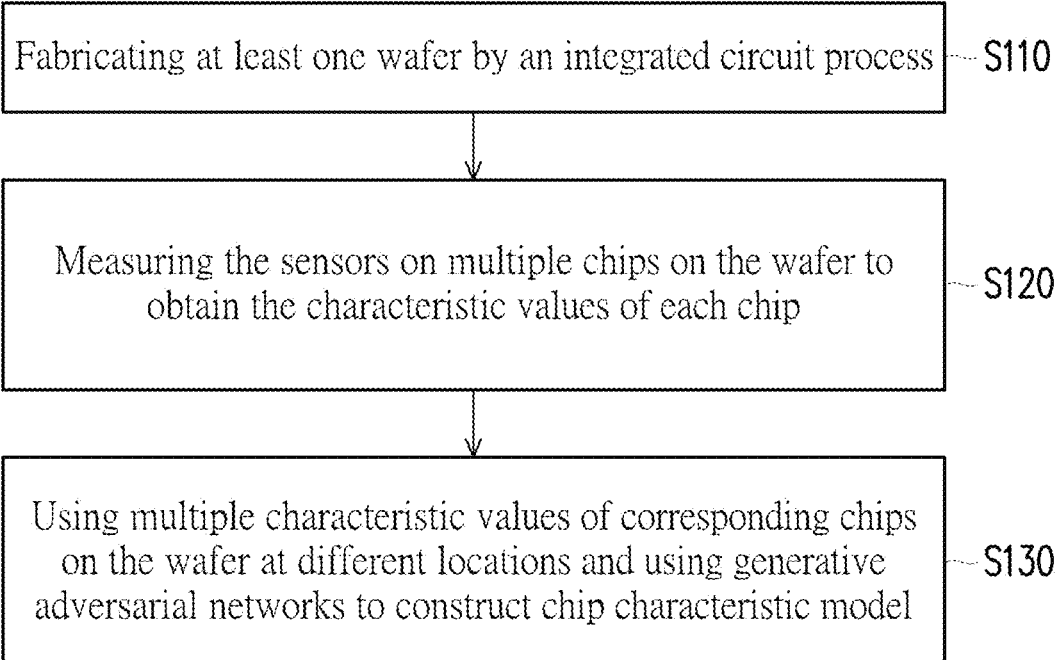

In an embodiment of the disclosure, a chip-assisted design device and a method for constructing a chip characteristic distribution model is provided. The chip-assisted design device includes a database and a processor. The database has a first chip characteristic distribution image data generated based on a wafer fabrication process data of a current process, wherein the first chip characteristic distribution image data represents a gradient distribution of at least one chip characteristic in one of the wafers produced through current fabrication process. The processor is coupled to the database. A second chip characteristic image data generated based on the first chip characteristic image data is used as a reference data for predicting the future wafer fabrication process, and the reference data is provided to the current fabrication process to evaluate or correct the first chip characteristic image.

In an embodiment of the disclosure, an IC chip-assisted design method comprises: providing, from a database, first chip characteristic distribution image data generated from wafer process data based on the current fabrication process, the first chip characteristic distribution image data representing the gradient distribution of at least one chip characteristic in one of the wafers produced in the current fabrication process; using, by a processor, the second chip characteristic image data generated from the first chip characteristic distribution image data as a wafer process reference for predicting future points in time; and providing the process reference data to the current fabrication process to evaluate and correct at least one of the first chip characteristic distribution image data; and The process reference is provided to the current fabrication process for evaluating and correcting at least one of the first chip characteristic distribution image data; and the chip characteristic distribution model is used to analyze the design circuit.

In an embodiment of the disclosure, a method of constructing a chip characteristic distribution model as described above comprising: manufacturing at least one wafer by an integrated circuit process, wherein each of the at least one wafer includes a plurality of wafers, and each of the wafers includes at least one sensor; measuring each of the sensors to obtain a chip characteristic value for each of a plurality of locations on the at least one wafer; and constructing a chip characteristic distribution model using the chip characteristic values at the locations a chip characteristic distribution model, wherein the chip characteristic values have a first chip characteristic distribution image data generated based on wafer fabrication data of the current line, wherein the first chip characteristic distribution image data represents a gradient distribution of at least one chip characteristic in one of the wafers produced by the current line, wherein the second chip characteristic image data generated based on the first chip characteristic distribution image data is used as a prediction of future The second chip characteristic image data generated from the first chip characteristic distribution data is used as a reference for predicting the wafer process of the production line at the future point in time.

Based on the above, in some embodiments of the present invention, an integrated circuit process is used to fabricate one (or more) wafers, wherein each of the wafers includes a plurality of wafers, and each of these wafers includes at least one sensor. By measuring these sensors, chip characteristic values at multiple locations on the wafer can be obtained, and these chip characteristic values can be used to construct a chip characteristic distribution model for the target production line. In the case where a designer intends to use the target line to fabricate an integrated circuit, the designer can use the chip characteristic distribution model associated with the target line to more accurately analyze the design of the circuit (integrated circuit) during the circuit design stage to improve production yields.

FIG. 1 is a schematic flow diagram of a method for constructing a chip characteristic distribution model in accordance with an embodiment of the present invention.

Figure 2:
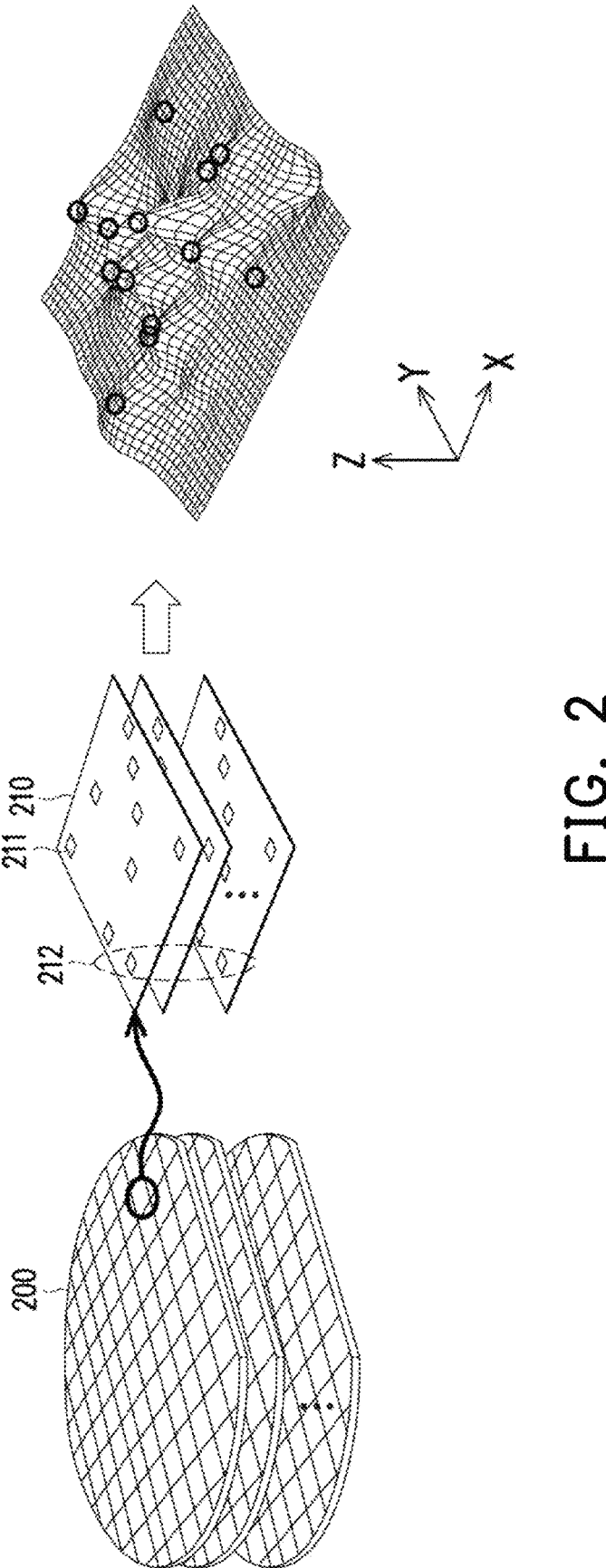

FIG. 2 is a schematic diagram illustrating multiple (or one) wafers in accordance with an embodiment of the present invention.

Figure 3:
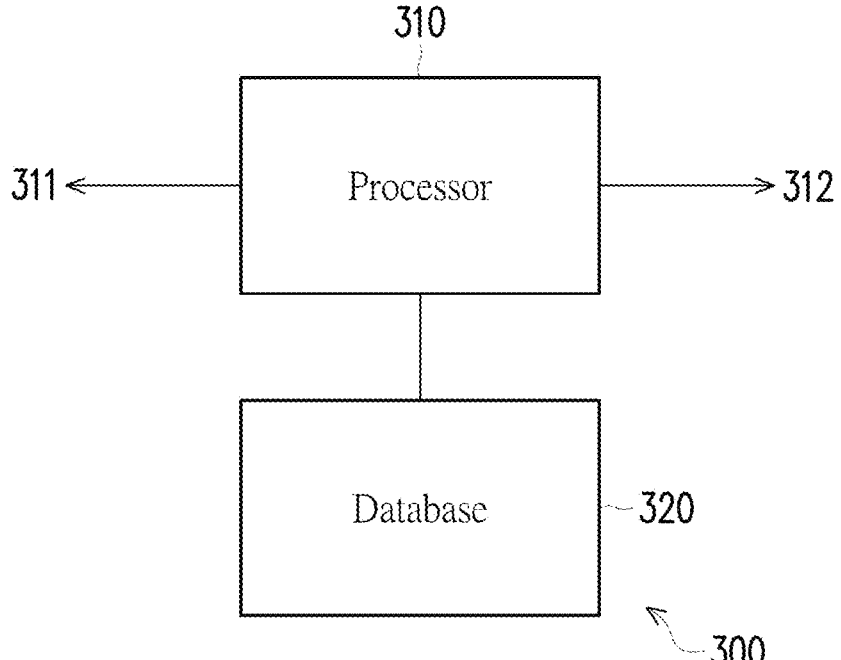

FIG. 3 is a schematic diagram of a circuit block of an integrated circuit-assisted design device in accordance with an embodiment of the present invention.

Figure 4A:
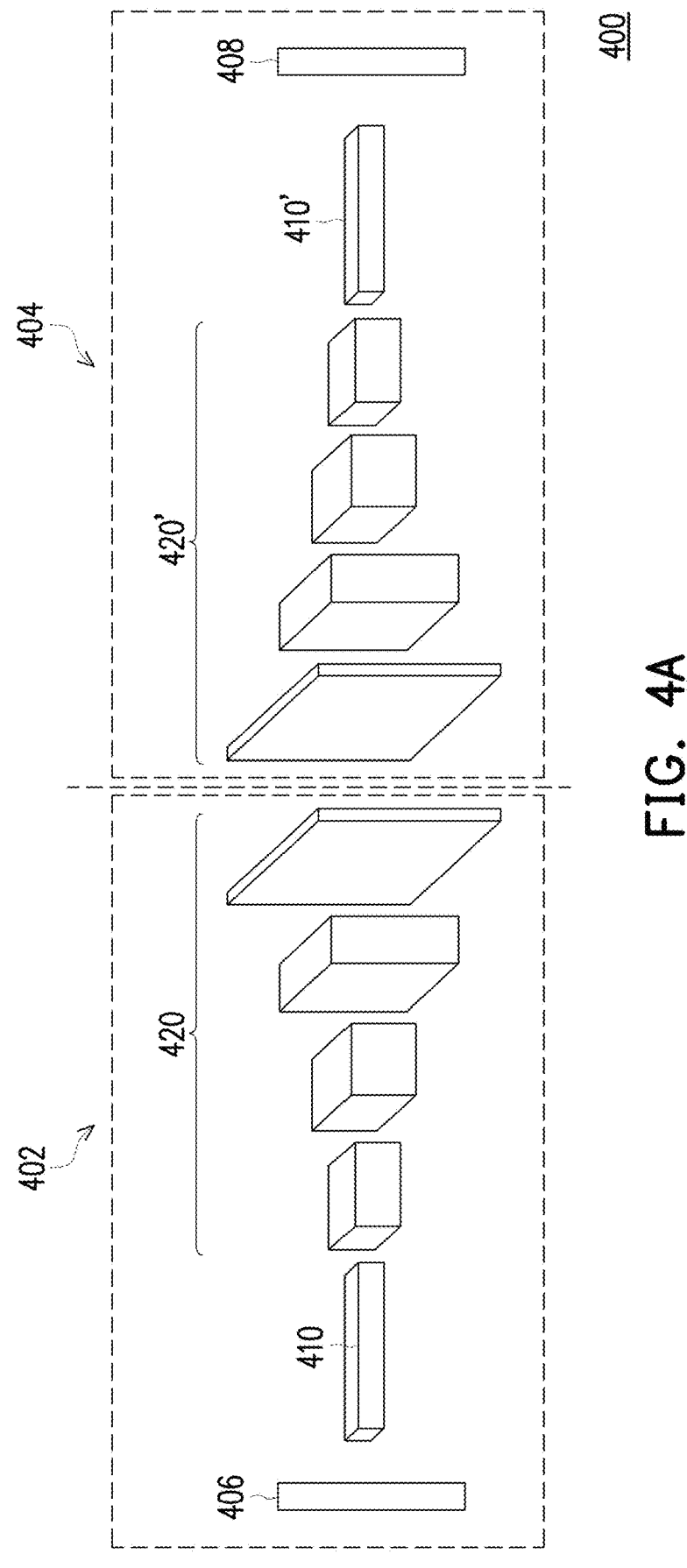

FIG. 4A is a schematic diagram of an architecture of an IC-assisted design method based on the use of a Generative Adversarial Network (GAN) to construct a chip characterization model to analyze data, in accordance with an embodiment of the present invention.

Figure 4B:
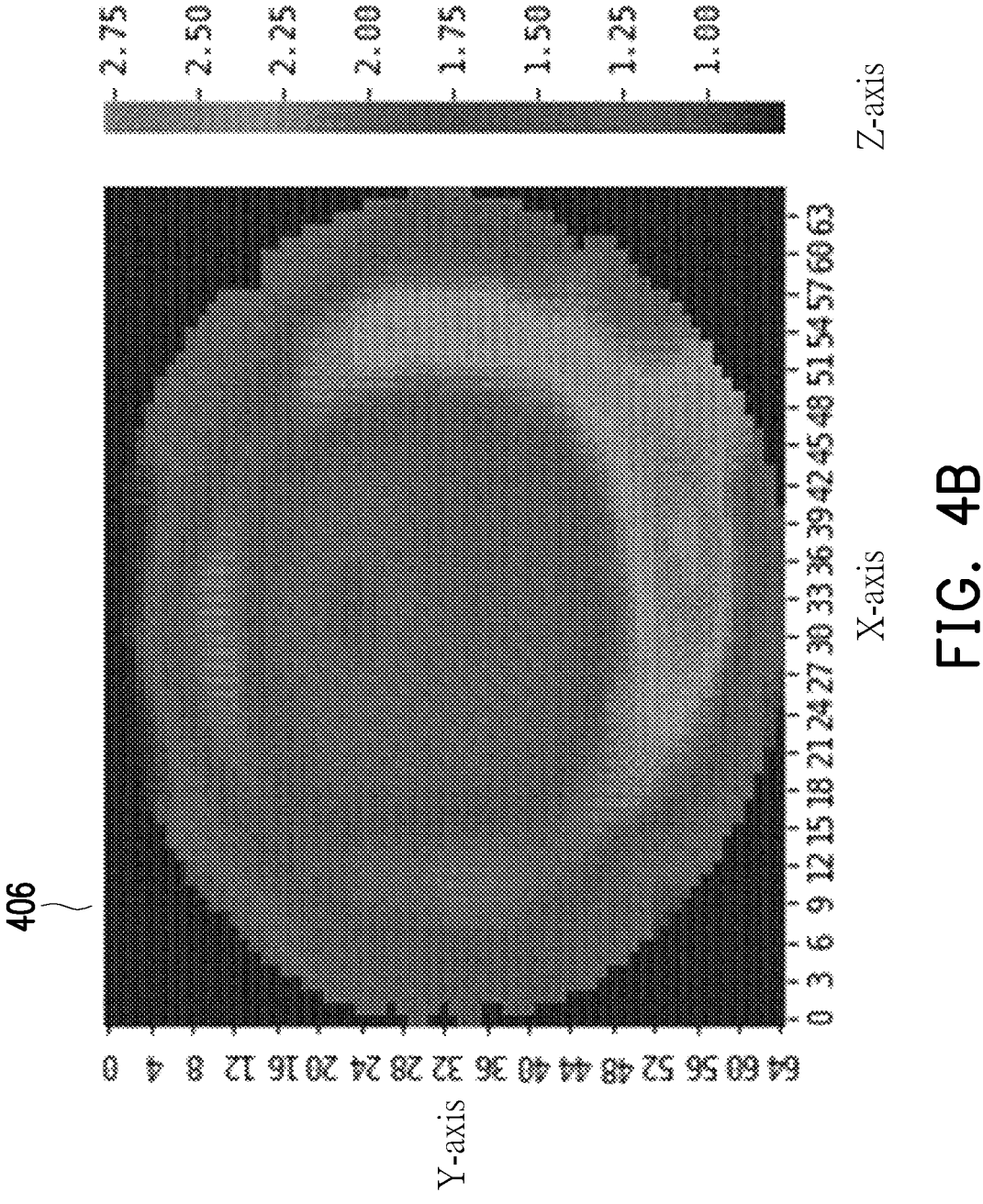

FIG. 4B is a schematic diagram of graphical data of process characteristics of an actual wafer in accordance with an embodiment of the present invention.

Figure 5A:
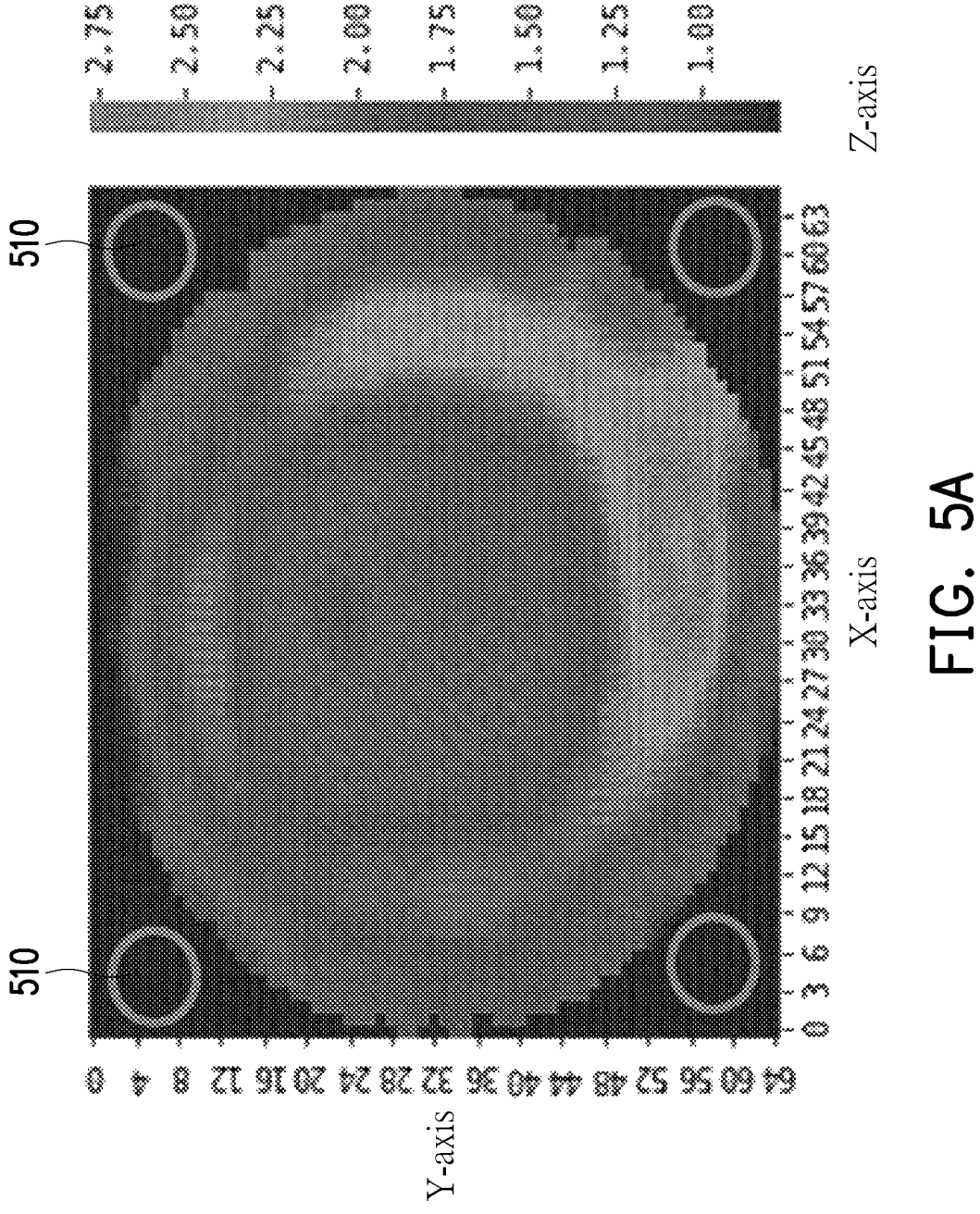

FIG. 5A is an illustration of graphical data of an actual wafer in accordance with an embodiment of the present invention, wherein the circles are indicated as data of non-reliable regions.

Figure 5B:
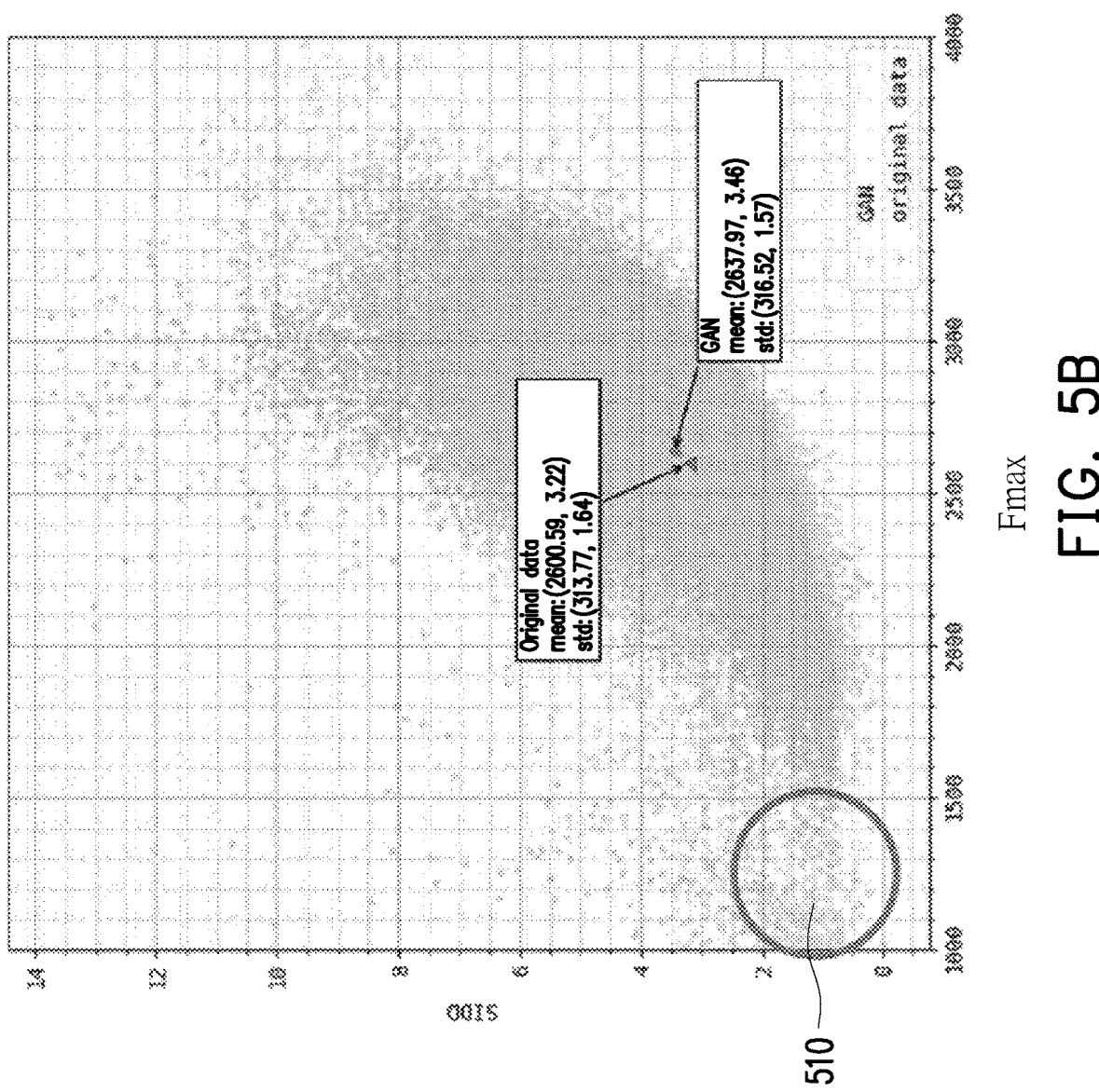

FIG. 5B is an illustration of the frequency value $(RO_u)$ of the SIDD to the ring oscillator in accordance with an embodiment of the present invention, where the circles are the data of the non-reliable regions.

Figure 6:
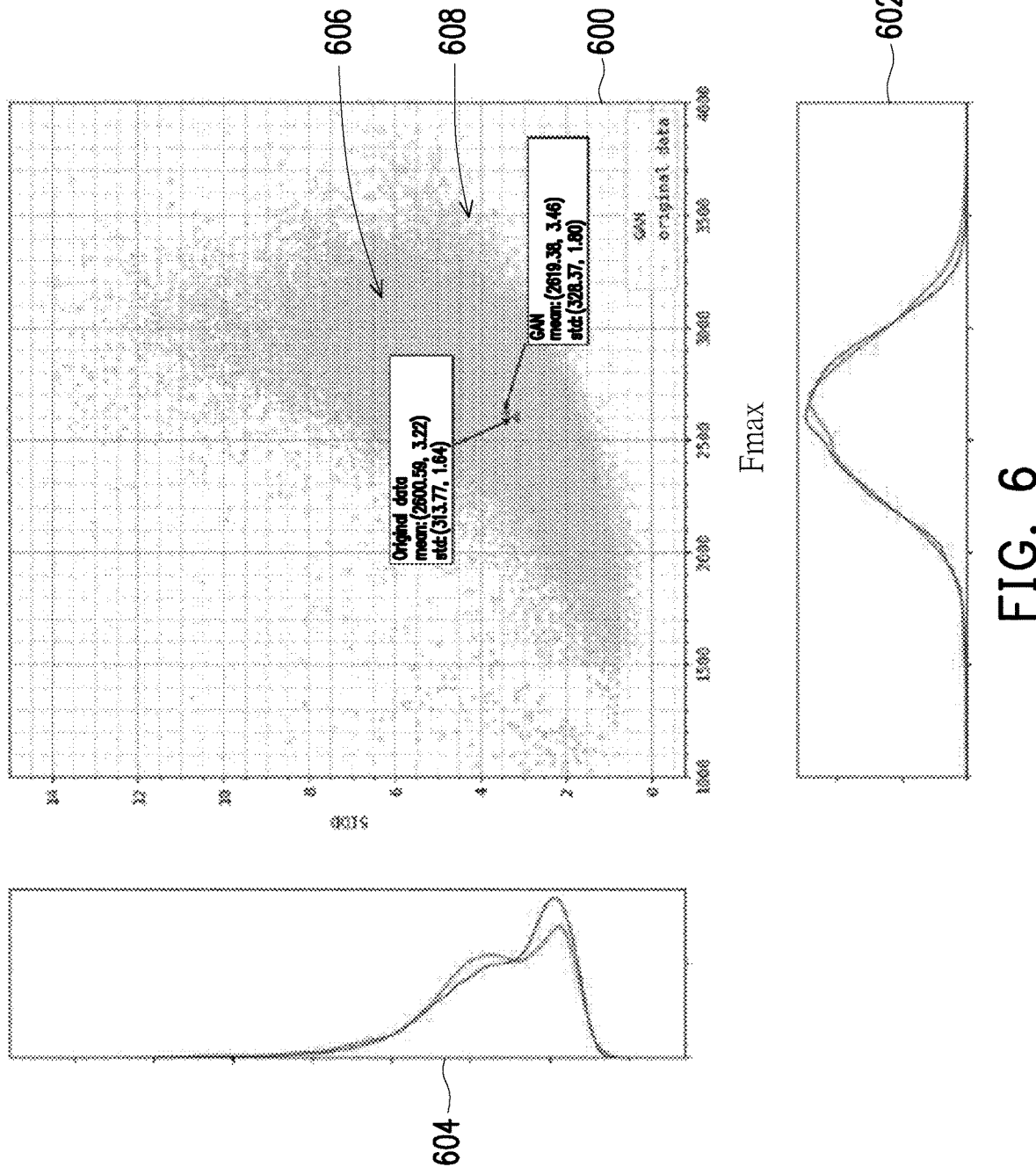

FIG. 6 is an illustration of the mean and standard deviation of the frequency value $(RO_u)$ of the ring oscillator by SIDD according to an embodiment of the present invention.

Figure 7:
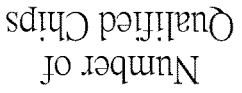
Figure 7:
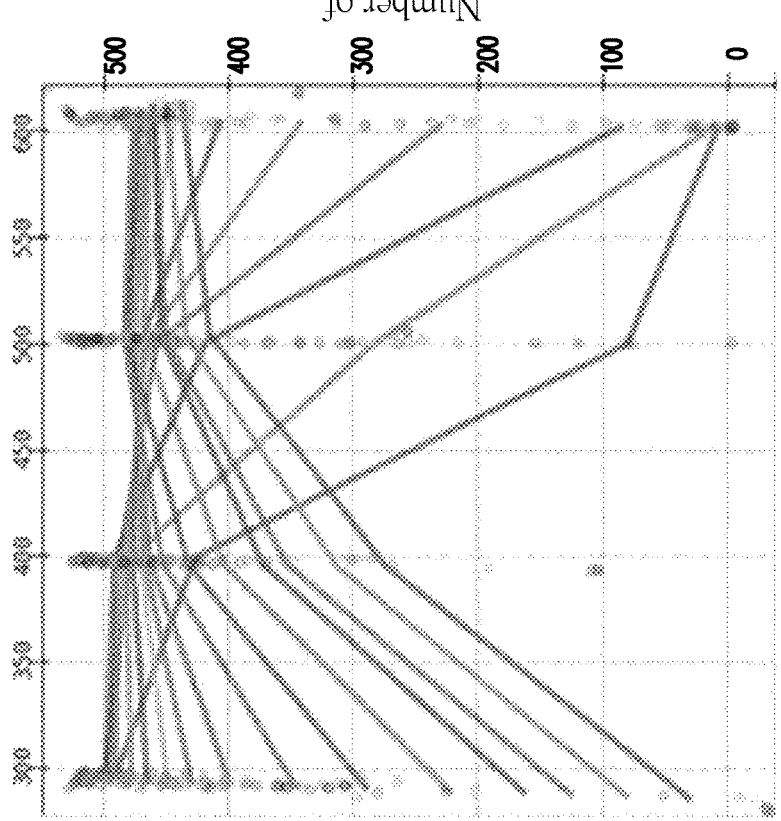
Figure 7:
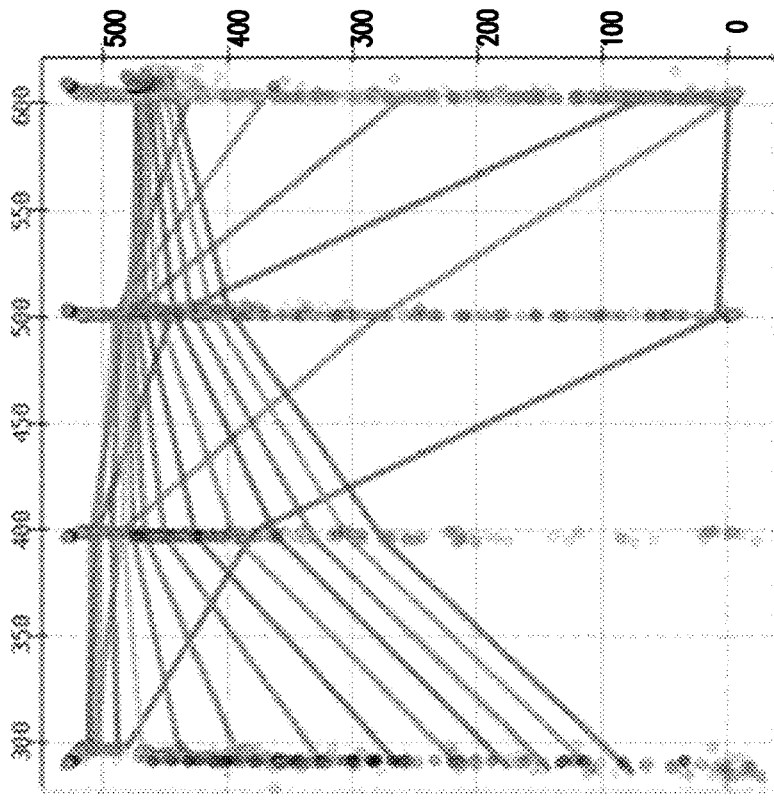

FIG. 7 is a schematic diagram of the readout data and the curve of the qualified chip in accordance with an embodiment of the present invention.

Figure 8A:
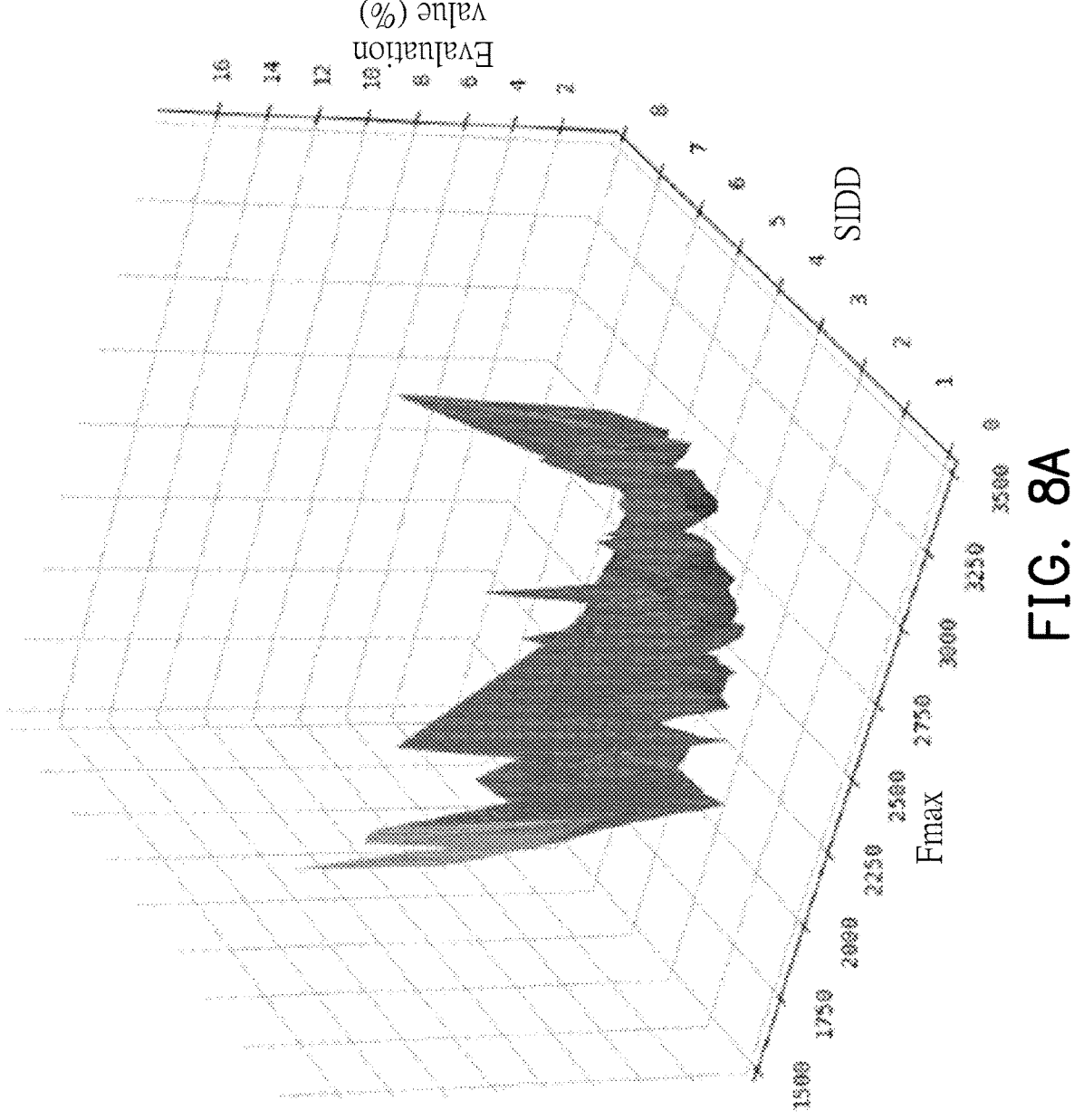

FIG. 8A is a schematic diagram of the distribution of the three-dimensional surfaces of the evaluation values before adding the process characteristics, in accordance with an embodiment of the present invention.

Figure 8B:
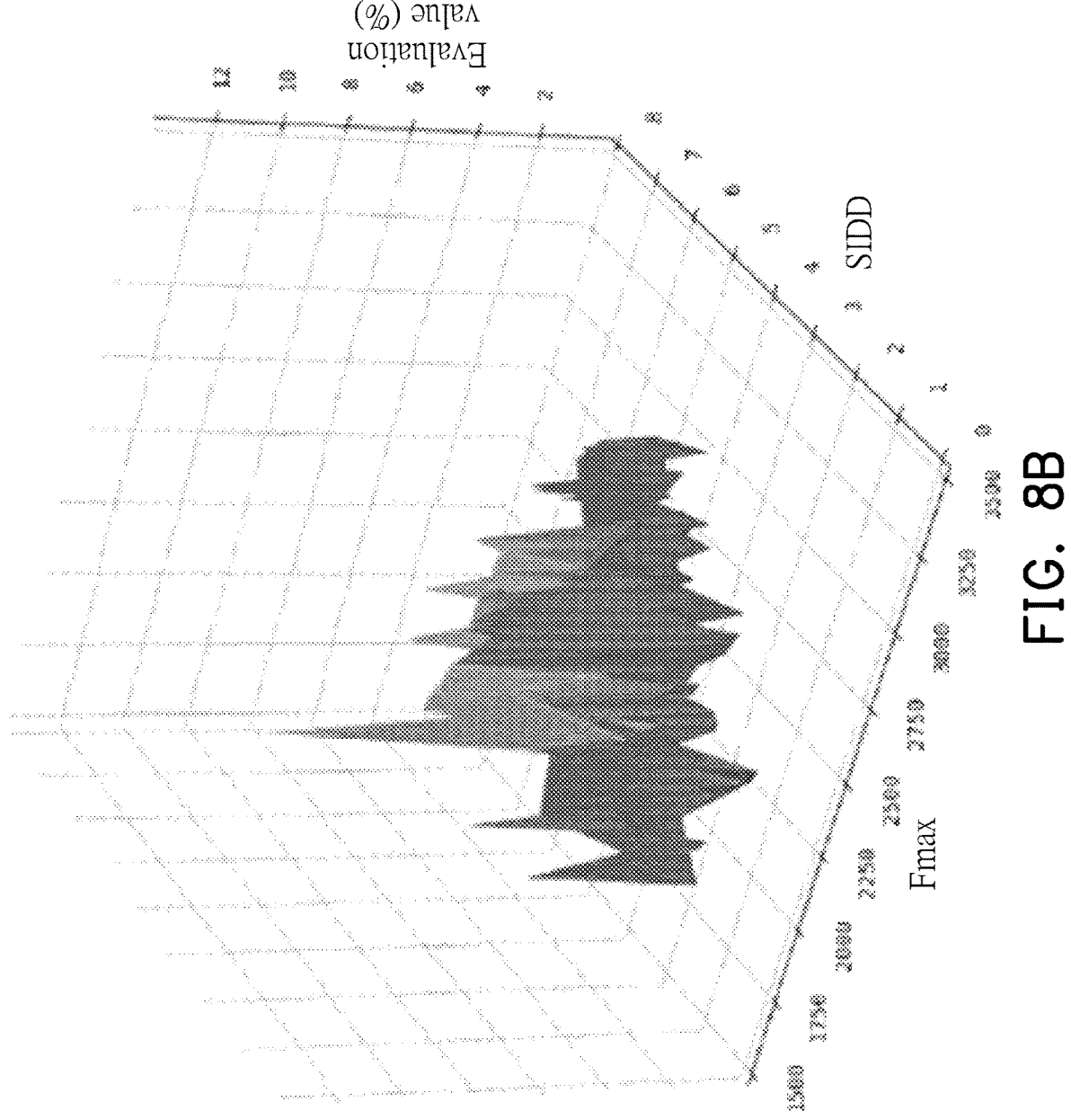

FIG. 8B is a 3D surface distribution diagram illustrating the evaluation value after the process feature is added, in accordance with an example of the present invention.

Figure 8C:
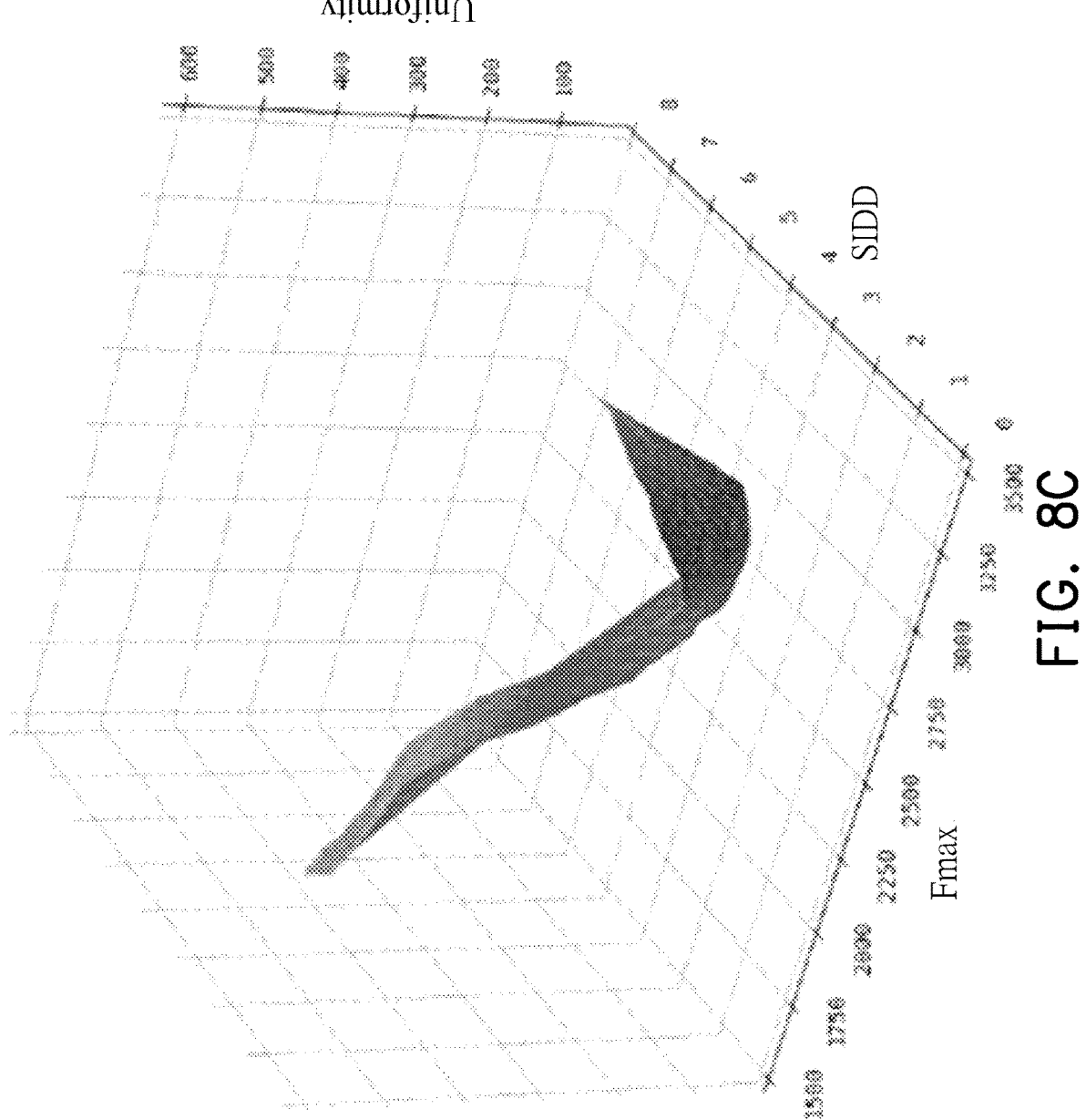

FIG. 8C is a 3D surface distribution diagram illustrating the original sample uniformity in accordance with an embodiment of the present invention.

Figure 8D:
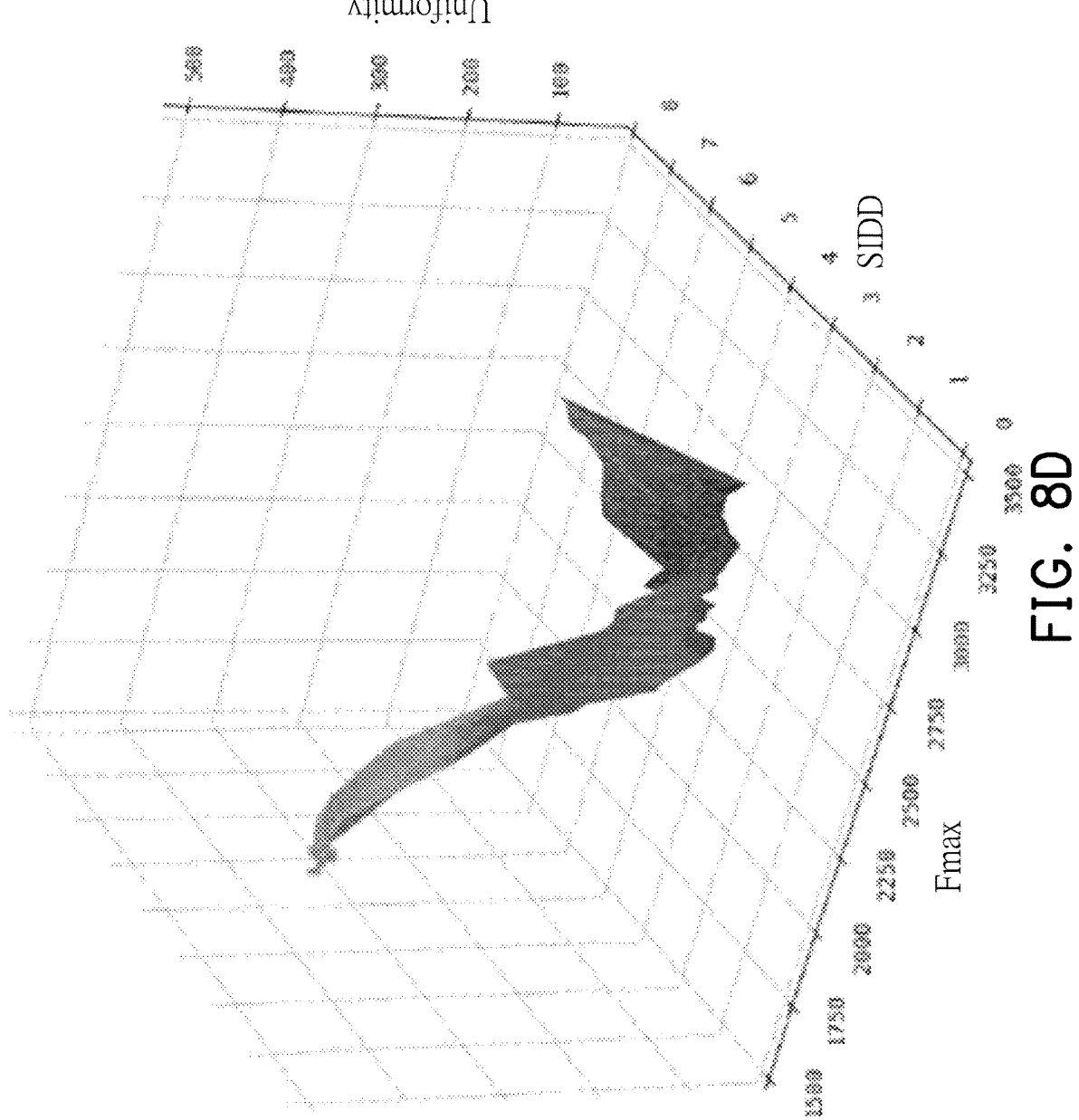

FIG. 8D is a 3D surface distribution diagram illustrating the sample uniformity before adding process features, in accordance with an embodiment of the present invention.

Figure 8E:
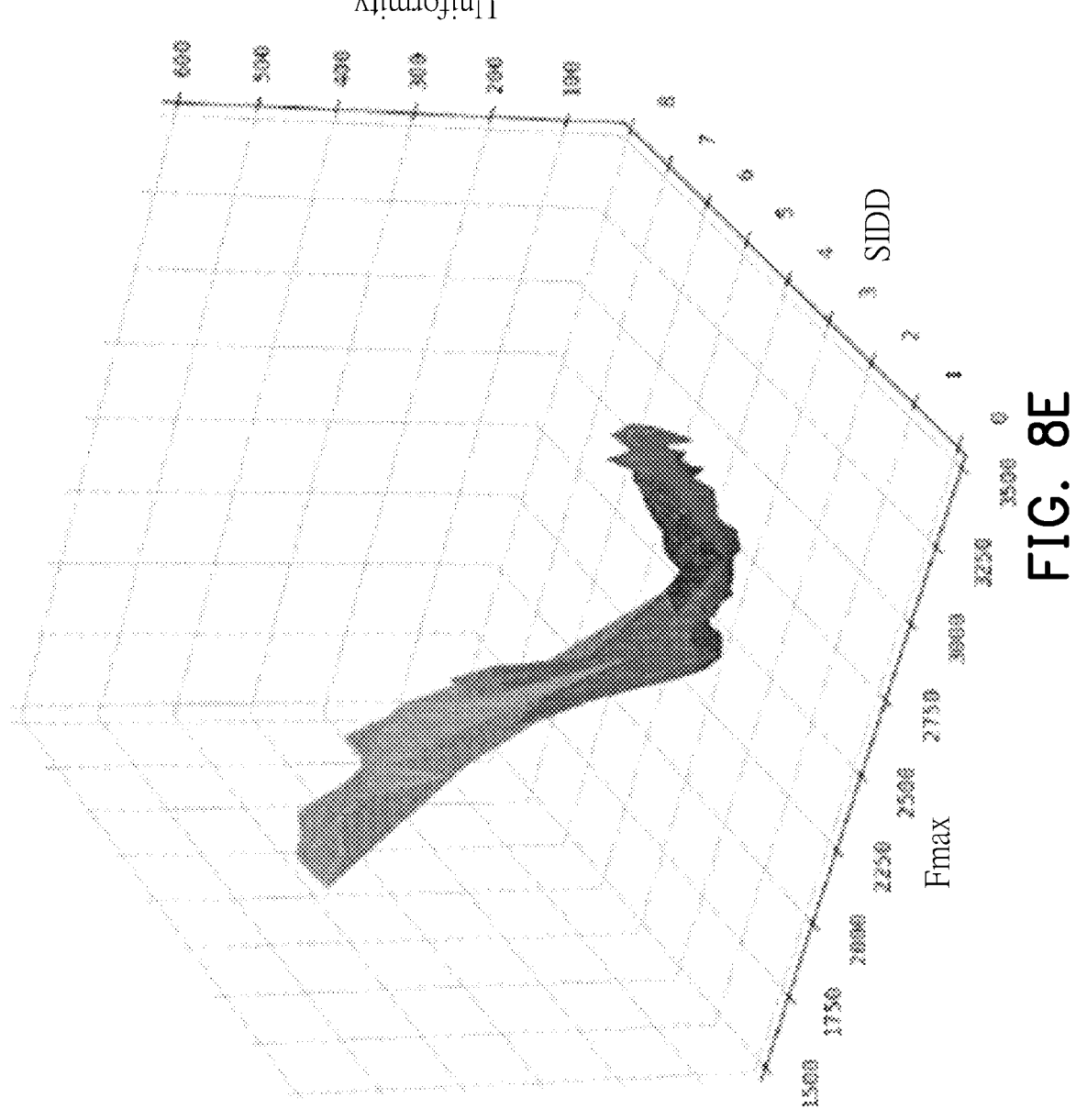

FIG. 8E is an illustration of a three-dimensional surface distribution of sample uniformity after adding the process characteristics conditions in accordance with an embodiment of the present invention.

Figure 9A:
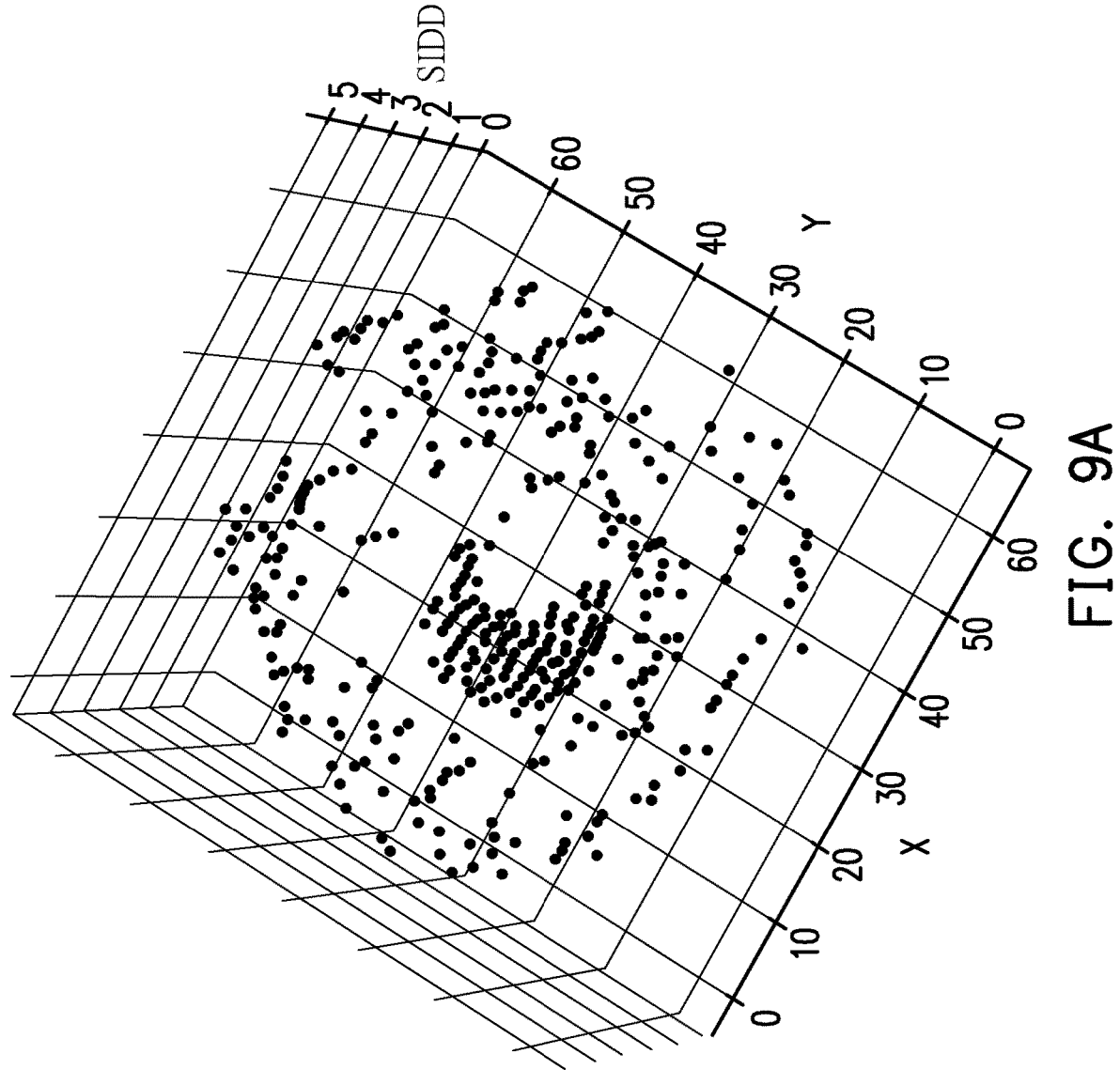

FIG. 9A is a 3D surface distribution diagram illustrating the surface profile of the SIDD in accordance with an embodiment of the present invention.

Figure 9B:
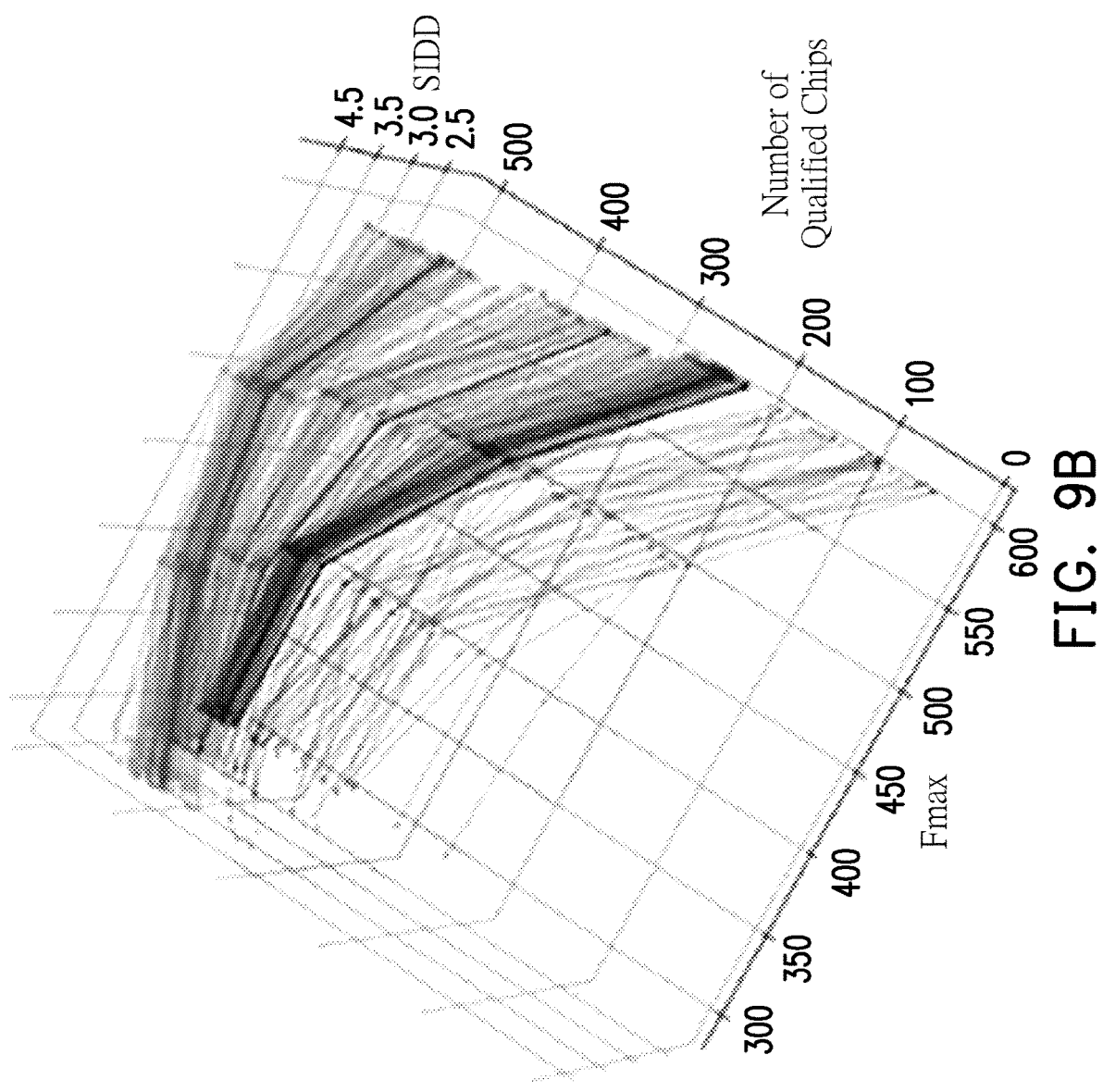

FIG. 9B is a schematic diagram of the curves illustrating the number of qualified chips under different frequency tests in accordance with an embodiment of the present invention.

Figure 10:
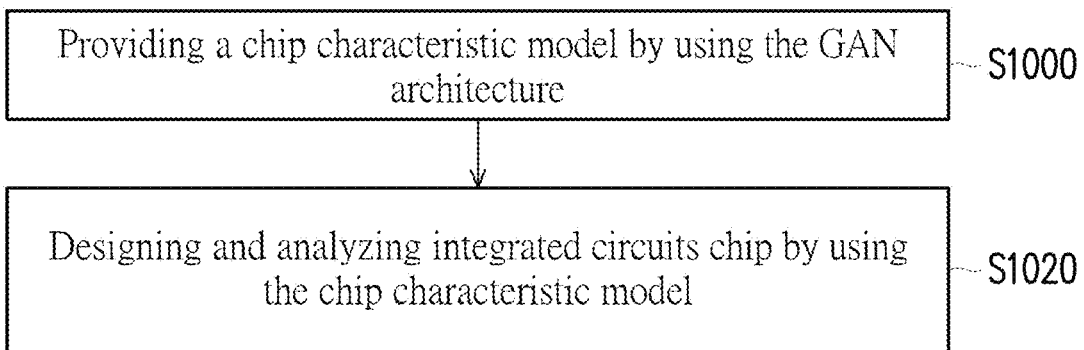

FIG. 10 is a schematic flow diagram of an integrated circuit assisted design method in accordance with an embodiment of the present invention.

DETAILED DESCRIPTION OF DISCLOSED EMBODIMENTS

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The term "coupling (or connection)" used in the entire specification (including the claims) of the present application may refer to any direct or indirect connection means. For example, if a first device is described as being coupled (or connected) to a second device, it should be interpreted that the first device may be directly connected to the second device or the first device may be indirectly connected to the second device through another device or certain connection means. Terms such as "first" and "second" mentioned in the entire specification (including the claims) of the present application are used to name the elements or to distinguish between different embodiments or ranges, but not to limit the upper limit or lower limit of the number of elements or to limit the sequence of the elements. In addition, wherever possible, elements/components/steps using the same reference numerals in the drawings and embodiments represent the same or similar parts. Related descriptions in different embodiments may be made with reference to each other for the elements/components/steps using the same reference numerals or using the same terminologies.

In general, process systematic defects result in different chip characteristic distributions in different locations on the same wafer. Depending on the actual design, these chip characteristics includes parasitic resistance, static leakage (static IDD or SIDD), ring oscillator (RO) frequency, or other chip characteristics. If the X and Y axes are used to represent the location in the wafer and the Z axis is used to represent the chip characteristics (e.g., the frequency of the ring oscillator), the gradient distribution of chip characteristics in the wafer often appears to be doughnut-like, or sombrero-like, or volcanic cone-like, or ripple-like.

A wafer can have a large number of die (also known as bare die). Different locations on the same wafer have different distributions of chip characteristics. Chips located in positions with a smoother slope of the chip characteristic distribution generally have chip characteristics that meet design requirements. Chips with a more skewed (or inclined) slope of the chip characteristic distribution may not meet the design requirements. Such non-compliant chips are typically discarded. Typically, due to process systematic defects, wafers produced by different production lines have different chip characteristic distributions, therefore, existing electronic design automation tools are unable to predict the chip characteristic distribution caused by process systematic defects. When designers intend to use a target production line to manufacture integrated circuits, if the designer can obtain the chip characteristic distribution (chip characteristic distribution model) related to the target production line at the circuit design stage, the integrated circuit design tool can more accurately analyze the design of the circuit (integrated circuit) based on the chip characteristic distribution related to the target production line, thus improving production yield.

FIG. 1 is a schematic flow diagram of a method for constructing a chip characteristic distribution model in accordance with an embodiment of the present invention. In step S110, one or more wafers can be fabricated through the semiconductor process of the target production line. Due to systematic defects in the process of the target production line, the wafers produced by the target production line have different chip characteristic distributions at different positions.

FIG. 2 is a schematic diagram illustrating multiple (or one) wafers in accordance with an embodiment of the present invention. Referring to FIG. 1 and FIG. 2, in step S110, a plurality of wafers 200 can be manufactured through the semiconductor process of the same target production line. FIG. 2 illustrates multiple wafers 200 on the left side, however, the number of wafers 200 can be determined based on design requirements. For example, in some embodiments, the number of wafers 200 shown in FIG. 2 may be one. Each of the wafers 200 includes multiple chips 210. FIG. 2 illustrates chips 210 at the same position in multiple wafers 200. Each of these chips 210 includes at least one sensor 211. Depending on the actual design requirements, the sensor 211 may include resistors, transistors, oscillators and/or other electrical components. The oscillator may be a ring oscillator (RO) or other oscillators. FIG. 2 illustrates multiple sensors 211 within a single chip 210, however, the number of sensors 211 can be determined based on design requirements. For example, in some embodiments, the number of sensors 211 within the same chip 210 can be any number.

The systematic defects of the process of the target production line will affect the chip characteristics of the sensor 211. Depending on the actual design, the chip characteristics may include voltage, current, parasitic resistance value, static leakage (static IDD or SIDD), oscillation frequency or other chip characteristic values. The systematic defects of the process will cause different chip characteristics at different positions within the same wafer. In step S120, each of these sensors 211 can be measured to obtain chip characteristic values at different positions on the wafer 200. For example, the chip characteristics may include the oscillation frequency of the oscillator. In the case where the sensor 211 includes a ring oscillator, in step S120, the oscillation frequency of each of these sensors 211 (ring oscillators) can be measured. For example, in the case where the sensor 211 includes a transistor, in step S120, the static IDD of each of these sensors 211 (transistor) can be measured as the chip characteristic.

The chip characteristic values of sensors 211 at the same location (e.g., location 212 as shown in FIG. 2) in different wafers 200 can be averaged (or summed, or other statistical processing) as the chip characteristic value for location 212. The right side of FIG. 2 illustrates the chip characteristic values at different locations within the chip 210. The X and Y axes on the right side of FIG. 2 represent positions within the wafer 200, and the Z axis on the right side of FIG. 2 represents chip characteristic values (e.g., ring oscillation frequency). As shown on the right side of FIG. 2, due to systematic defects in the fabrication process, different positions within the wafer 200 have different chip characteristic values.

Referring to FIG. 1, in step S130, a chip characteristic distribution model of wafer 200 using the different chip characteristic values at different locations of wafer 200 may is able to be constructed. The chip characteristic distribution model may represent the correlation between a certain chip characteristic and its location in wafer 200.

For example, these chip characteristic values at different locations on wafer 200 can be used as a data set for training and constructing a gradient surface using an artificial intelligence algorithm (e.g., machine learning, deep learning, or reinforcement learning, etc.), where the X and Y axes of the gradient surface represent the locations in wafer 200 and the Z axis of the gradient surface represents the wafer characteristic values. In practical design, in some embodiments, step S130 may use machine learning methods to construct a chip characteristic distribution model of wafer 200 based on these chip characteristic values (gradient surfaces) of wafer 200. The embodiment of the embodiment details of the machine learning methods are not limited herein.

For example, in some embodiments, step S130 may use the chip characteristic values at different locations of wafer 200 as training set data and use Generative Adversarial Network (GAN) model to predict chip characteristics at specific locations of wafers produced in a corresponding process line and analyze them by rolling iterations.

The chip characteristic distribution models are constructed by adding new training sets at regular or irregular periods based on the latest wafer process line conditions to ensure that optimal and increasingly accurate chip characteristic distribution prediction models can be generated in real time. For example, in some embodiments, in step S130, the machine learning methods, regression operations, or other machine learning methods may be used to construct the chip characteristic distribution model for wafer 200.

In some embodiments, step S130 may use derating regression method to construct a gradient surface (chip characteristic distribution model) based on the chip characteristics values of wafer 200. In other embodiments, step S130 may treat the wafer characteristics values at different locations on wafer 200 as pixel values at different locations of an image frame, and perform image processing to construct the wafer characteristics distribution model of wafer 200. This embodiment is not limited to the embodiment details of the image processing. For example, in some embodiments, step S130 may use cosine transform operation or other image processing methods to construct the chip characteristics distribution model of wafer 200. After the step S130 is finished, the chip characteristics distribution model can be stored in a database for electronic design automation (EDA) tools or other integrated circuit design assistance tools to use.

Depending on the design requirements, the chip characteristic distribution model shown in FIG. 1 can be implemented as hardware, firmware, software (i.e., program), or a combination. In the hardware form, the functions of steps S120 and/or S130 shown in FIG. 1 can be implemented in a logic circuit of an integrated circuit. The chip 210 may be implemented as hardware using hardware description languages (e.g., Verilog HDL or VHDL) or other suitable programming languages. The functions associated with steps S120 and/or S130 may be implemented in one or more controllers, microcontrollers, microprocessors, application-specific integrated circuits (ASICs), digital signal processors (DSPs), field programmable logic gateways (FPLGs), and other logic circuits. The various logic blocks, modules, and circuits in a microcontroller, microprocessor, application-specific integrated circuit (ASIC), digital signal processor (DSP), field programmable gate array (FPGA), and/or other processing unit. In software form and/or firmware form, the functions associated with the above steps S120 and/or S130 may be implemented as programming codes. For example, the above steps S120 and/or S130 can be implemented using general programming languages (e.g., C, C++ or a combination of languages) or other suitable programming languages. In some embodiments, the non-transitory computer readable medium. In some embodiments, the non-transitory computer readable medium includes, for example, read only memory (ROM), tape, disk, card, semiconductor memory, programmable logic circuits and/or storage devices. The storage device includes a hard disk drive (HDD), solid-state drive (SSD), or other storage device. The computer, central processing unit (CPU), controller, microcontroller, or microprocessor may read and execute the programming code from the non-transitory computer readable media to perform the functions associated with steps S120 and/or S130 above. Furthermore, the programming code may also be provided to the computer (or CPU) by any transmission medium (communication network or broadcast radio waves, etc.). The communication network is, for example, the Internet, a wired communication network, a wireless communication network or other communication medium.

FIG. 3 is a schematic diagram of a circuit block of an integrated circuit-assisted design device 300 in accordance with an embodiment of the present invention. The integrated circuit-assisted design device 300 shown in FIG. 3 includes a processor 310 and a database 320 having a chip characteristic distribution model, wherein the chip characteristic distribution model may represent a gradient distribution of chip characteristics in a wafer. FIG. 4 is a schematic flow diagram of an integrated circuit assisted design method in accordance with an embodiment of the present invention. Referring to FIG. 3 and FIG. 4, in step S1000, the database 320 may provide a chip characteristic distribution model to the processor 310, and the chip characteristic distribution model is described with reference to FIG. 1 and FIG. 2, and is therefore not repeated.

In step S1020, processor 310 can analyze the design circuit (integrated circuit) 311 using the chip characteristic distribution model provided by database 320, and generate analysis results 312. The embodiment does not limit the embodiment details of the analysis performed by processor 310. For example, processor 310 may perform any analysis (e.g., timing analysis). In some embodiments, processor 310 may calculate the gradient of SIDD in the design circuit by using the chip characteristic distribution model described. The processor 310 may use the SIDD to perform static power consumption analysis of the design circuit. For example, processor 310 can perform die to die performance gradient analysis to generate an equivalent SIDD gradient distribution model (or distribution image) in the wafer by using the die distribution model provided in database 320.). The processor 310 can use the equivalent SIDD gradient distribution model to predict or calculate the real SIDD gradients required to design the integrated circuit.

In some embodiments, the processor 310 may calculate the frequency gradient of the chip operation in the design circuit by using the chip characteristic distribution model. The processor 310 may perform dynamic power consumption analysis of the design circuit using the SIDD. For example, processor 310 may perform a die-to-die characteristic gradient analysis to generate an equivalent frequency gradient distribution model of the wafer by using the die characteristic distribution model provided by database 320. The processor 310 may use the equivalent operation frequency gradient distribution model to calculate an chip operation frequency gradient for the designed integrated circuit.

In some embodiments, the processor 310 may calculate a gradient in the number of qualified wafers in the design circuit by using the chip characteristic distribution model. The processor 310 may perform a reliability analysis of the design circuit using the example SIDD. For example, processor 310 may perform a die-to-die characteristic gradient analysis to generate a qualified die count gradient distribution model of the wafer by using the die characteristic distribution model provided by database 320. The processor 310 may use the qualified wafer count gradient distribution model to calculate or modify the number of chip configurations for the design circuit.

FIG. 4A is a schematic diagram of an architecture of an IC-aided design method using Generative Adversarial Network (GAN) 400 to construct a chip characterization model to analyze data in accordance with an embodiment of the present invention. FIG. 4B is a schematic diagram of the process characteristic data of an actual wafer according to an embodiment of the present invention, where the value of the Z-axis refers to the leakage current (SIDD).

In accordance with an embodiment of the present invention, the generative adversarial network (GAN) architecture 400 includes a generator 402 (generating element) and an authenticator 404 (adversarial element), which in this embodiment receives a noise vector 406 at the input side. In this embodiment, the input image of the authenticator 404 has a data set.) The data set includes characteristic data for each wafer in the wafer, where the chip characteristic data includes: wafer ID data, wafer location information on the wafer corresponding to the wafer location on the wafer. SIDD data, Fmax data, and a one-dimensional array of qualified chip characteristic data. The one-dimensional array data including the chip characteristics data is first translated into a two-dimensional (or three-dimensional) array data as the input image data. The distribution information learned by the generator 402 is present in the parameters of its own network, and random variables are used to generate random and expected data. The discriminator (counterpart) 404 includes an output loss function data (or wafer map) 408. In one embodiment, the discriminator 404 discriminates by receiving input images (e.g., real images from the generator 402 pseudo-images or datasets) and outputting loss function data. In one embodiment, the GAN architecture 400 may be a deep convolutional generative adversarial network (DC-GAN) architecture. In other words, the generator 402 may use a hierarchical convolution layer (or inverse convolution layer) (transpose convolution or fractionally-strided convolution) for image scene segmentation, reshape, and model generation.

In an example embodiment, translating the 1-dimensional array data with chip characteristic data into 2-dimensional (or 3-dimensional) array data for the noise vector 406 consists of the following three steps. First, the anomalous values are filtered out. Since the wafer characterization data set is derived from direct measurement of the wafer, these records include some outliers. To remove these outliers, it is necessary to first select a specific range of data for each feature. For example, in an embodiment, data that are less than three standard deviations from the mean of the original data set are selected for analysis. Through this step, about 0.3% of the original data can be filtered out. Second, additional features are added. Even though the original dataset has a high resolution, additional important metrics need to be added to the dataset to further verify the sample quality of the 1D array data input to the GAN and to improve the data quality of these wafer features. Next, data are collected for each wafer (die or bare die) on the wafer to form the overall wafer image. Finally, the wafer index on each wafer is used to reconstruct the overall wafer image by filling the image with wafer data, where the wafer height and weight data correspond to the maximum values of the x and y coordinates, respectively.

In an embodiment, each chip characteristic (feature) is displayed in the wafer image as a different channel of image. In one embodiment, since the shape of the wafer image is rectangular and the shape of the actual wafer is circular, the minimum value of the corresponding chip characteristic is used to fill in the values other than the actual wafer image to reconstruct the overall wafer image in order to prevent image errors at the wafer edges. In addition, in one embodiment, a medium filter is applied to the wafer image to fill in the missing pixels in the wafer image. Finally, wafer images that do not have sufficient chip characteristic data are filtered.

In one embodiment, after translating the one-dimensional array data into image data (or wafer maps), the wafer image data 406 is pre-processed before being input to the generator 402 and the discriminator 404 in the GAN architecture 400 for training. In one embodiment, two methods of preprocessing are used.

In an embodiment, the wafer image data 406 is normalized. For example, the maximum (max) and minimum (min) values of the corresponding chip characteristics in the wafer image data 406 are extracted first. Then, each data x is normalized by $$y = 2 * \frac{x - \min}{\max - \min} - 1$$

is normalized by the conversion method. By this operation, the new range of values that can represent the chip characteristics can be reduced from (min, max) to (−1, 1).

In an example embodiment, the wafer image data 406 is standardized. First, the mean u and standard deviation σ of the corresponding chip characteristics in the wafer image data 406 are extracted, and then each data x is standardized by $$y = \frac{x - \mu}{\sigma}.$$

By this operation, the distribution of the new data will have a mean of 0 and a standard deviation of 1. In an embodiment, regularization is used for chip characteristics that can be presented as integers, such as the number of qualified wafers (passcore), while standardization is used for chip characteristics with continuous distribution, such as SIDD and Fmax.

GAN framework can be applied to various tasks of image generation, such as face, painting, etc. In one embodiment, GAN is used to learn the distribution of characteristic images of wafers. In addition, by adding additional chip characteristics, the GAN can learn the local distribution of wafer images in higher dimensions. In one embodiment, the GAN consists of two parts. A generator 402 and an authenticator 404.

In an embodiment, the generator 402 is used to reconstruct an image from a noise distribution, as shown in FIG. 4B. The structure of generator 402 is based on DCGAN, in which the input is a noise vector with 50 dimensions, each of which obeys a standard normal distribution. After sampling from the noise distribution, three layers of neurons are passed through, a fully connected layer 410 and four fractionally-strided convolutional layers. In one embodiment, the number of layers of the fully connected layer 410 and the fractionally-strided convolutional layer 420 is not limited. In addition, in one embodiment. Leaky ReLu is used as the activation function for all layers, and batch normalization is used for the neural network except for the noise vectors. The output of generator 402 is a fake wafer map with the same size as the real wafer map. In this case, the real wafer map is the actual measured wafer distribution pattern with one or more chip characteristics.

In one embodiment, the authenticator 404 is used to verify the quality of the pseudo-wafer image generated by the generator 402. The input to the authenticator 404 may be a pseudo-wafer image or a real wafer image. In an example embodiment, the discriminator has three layers, four layered convolution layers 420' and one fully connected layer 410'. The hierarchical convolution layer 420' of the authenticator 404 is symmetrical to the hierarchical convolution layer 420 of the generator 402, and one or more wafer images with chip characteristics of the same size as the generator 402 can be generated during the processing of the authenticator 404. The fully connected layer reduces the dimensionality to one dimension and is used to identify whether the input is a pseudo wafer map. In one embodiment, the same Leaky ReLu function as the generator 402 is used as the activation function for all layers. In one embodiment, the loss function applicable to the Wasserstein distance GAN gradient penalty (WGAN-GP) is used, and instance normalization is applied to the neural network except for the output data, normalization.) In other words, the height and width of each channel in each sample are standardized. In an embodiment, the Wasserstein distance can be used to calculate the distance between two distributions (real chip characteristic data and pseudo-chip characteristic data), and the applicable loss function is more stable than using JS divergence, while the gradient constraint can optimize the loss function based on WGAN to make the training process more stable. In an embodiment, the number of layers in the fully connected layer 410' and the layered convolution layer 420' is not limited.

In one embodiment, chip characteristic data from a specific wafer line is used, and two chip characteristic values, wafer measurement and uniformity, which represent the physical properties of the wafer, are added to improve the quality of the pseudo-wafer image used to predict chip characteristics.

In one example, the evaluation value and uniformity of the wafer can be determined by the following equation.

$$\text{Evaluated value} = F \cdot P \qquad (1)$$

$$\text{Uniformity} = |\overrightarrow{p_1} + \overrightarrow{p_2} + \dots + \overrightarrow{p_k}| \qquad (2)$$

In other words, the evaluation value is the total value generated by the inner product of a set of operating frequencies (F) and a qualified wafer profile (P) in the data set with respect to the characteristics of the qualified wafer. For example, in an embodiment, F=(300, 400, 500, 600) in the dataset means that the qualified wafer is measured at a set of different operating frequencies of 300 MHz, 400 MHz, 500 MHz and 600 MHz, and the wafer still operates normally. On the other hand, the qualified wafer profile (P) represents the corresponding distribution of wafer positions on the wafer for the qualified wafer test at the corresponding frequency. Uniformity is used to indicate the uniformity of the distribution of the qualified wafer profile, where $\overrightarrow{p_i}$ represents the characteristic value of the qualified wafer at frequency i, and $\overrightarrow{p_i}$ The angle of i*k/360 where k denotes the number of qualified wafers. The more the value of the uniformity is close to 0, the more uniform the distribution of the qualified wafer profile is.

In an embodiment, the parameters of the GAN are set as follows: the learning rate (η) using the adaptation parameter (n) is 0.0005 (i.e., η=0.0005), the first momentum bias correction (b1) for the gradient is 0.5 (i.e., b b1=0.5), and the second momentum bias correction (b2) of 0.999 (i.e., b2=0.999) of the Adam optimizer to train the generator 402 and the discriminator 404 to determine the way to update the neural network with the loss function. For example, whether to consider the loss incurred during the previous iteration of training or whether to consider changing the learning rate with the number of iterations of training. The Adam optimizer iteratively updates the weights of the neural network based on the training set data to perform adaptive moment estimation. The first momentum bias correction (b1) and the second momentum bias correction (b2) are used to control the decay rate of the moving average. In an embodiment, the data of all training sets are sliced into batch sizes for each training session. In other words, the data of the training set is divided into 16 equal parts and the number of training sessions is 200. In particular, the generator 402 and the discriminator 404 are trained alternately using real wafer images translated into two (or three) dimensions. In one embodiment, the generator 402 is updated once and the authenticator 404 is updated 5 times. In one embodiment, the SGD optimizer is used to train the generator 402 and the authenticator 404.

FIG. 5A is an example of an actual wafer graphical data in accordance with an embodiment of the present invention, where the circles are the data of the non-relying interval. FIG. 5B is an illustration of the SIDD to ring oscillator frequency value ($RO_u$) in accordance with an embodiment of the present invention, where the circles are non-reliable data.

First, since the shape of the actual wafer is circular, the sample generated from the generator 402 is a rectangular image. Therefore, it is reasonable to ignore the data located outside the circular range of the actual wafer. Second, even if the data inside the wafer is selected, there is still some unreasonable data. For example, the ideal value of Fmax is at least 1500 according to the distribution of the real data, but the distribution of Fmax for the pseudo-wafer image data is more continuous between 1000 and 1500. In other words, the data of the non-reliable interval is usually located at the edge of the wafer profile. The reason for this is that there is a large gap between the area inside the wafer and the area outside the wafer. Therefore, in an embodiment, the generator 402 generates one or more intermediate values of Fmax at the edge of the wafer image.

FIG. 6 is a schematic diagram of the mean and standard deviation of the frequency values ($RO_u$) of the ring oscillator by SIDD according to an embodiment of the present invention. Referring to FIG. 6, in one example, the similarity between the real wafer image data and the pseudo-wafer image data is compared by means of label dimension and wafer dimension. The mean points of Fmax and SIDD are very close to each other, and the standard deviation is less than 5%. In addition, the histograms 602 and 604 of the Fmax and SIDD markers (lower and left side of the scattering relation) also show that the distribution of the fake data is very similar to that of the true data. The average points (Fmax. SIDD) of the true data set 606 and the pseudo data set 608 are located at (2600.59, 3.22) and (2619.38, 3.46). The standard deviations of (Fmax. SIDD) for the true data set 606 and the pseudo data set 608 are (313.77, 1.64) and (328.37, 1.80). In other words, the distribution of (Fmax. SIDD) of the real dataset 606 and the pseudo dataset 608 are very close to each other. Therefore, the pseudo wafer image data generated by the generator using a small amount of chip characteristics data of the wafers of the production line is very suitable as a reference for predicting the chip characteristics of the wafers produced by the production line in the future time to assist in the design of the IC wafers.

FIG. 7 is a schematic diagram of the read data and the curves of the qualified wafer in accordance with an embodiment of the present invention. Referring to FIG. 7, in an example embodiment, for a passcore. FIG. 7 illustrates the corresponding distribution of the passcore wafers throughout the SIDD. The left half of FIG. 7 shows the trend of chip characteristics (SIDD and qualified wafer) for the dataset read from the real wafer image data, and the right half of FIG. 7 shows the trend of chip characteristics (SIDD and qualified wafer) for the dataset sample of the pseudo wafer image data generated by the generator. It can be seen that the trend distributions of the two trend plots are quite consistent, indicating that the generator has learned the chip characteristics patterns of the wafers produced in the production line by training on the dataset of real wafer image data and generating a model that can be used to predict the chip characteristics patterns of the wafers in the production line.

FIG. 8A is a schematic diagram of the distribution of the three-dimensional surfaces of the evaluation values before the process feature is added in accordance with an embodiment of the present invention. FIG. 8B is a graphical representation of the distribution of the three-dimensional surfaces of the evaluated values after the process feature is added, in accordance with an example of the present invention. FIG. 8C is an illustration of a three-dimensional surface distribution of the original sample uniformity in accordance with an embodiment of the present invention. FIG. 8D is an illustration of a three-dimensional surface distribution of sample uniformity before adding process features, in accordance with an embodiment of the present invention. FIG. 8E is an illustration of a three-dimensional surface distribution of sample uniformity after adding process features in accordance with an embodiment of the present invention.

Referring to FIG. 8A through FIG. 8E. FIG. 8A through FIG. 8E illustrate two additional chip characteristics, evaluation value and uniformity. FIG. 8A shows the distribution of chip characteristics based on SIDD. Fmax and evaluated values in percentage of error marked on the axes, where the maximum percentage of error of evaluated values before adding process characteristics as evaluation parameters of chip characteristics is 16%. FIG. 8B shows the distribution of the chip characteristics based on the SIDD. Fmax and the evaluated values in percent error marked on the axes, where the maximum percentage error of the evaluated values after adding the process characteristics as the evaluation parameters of the chip characteristics is 12%. FIG. 8A and FIG. 8B show that the generator learns the evaluated values better after adding the test set with both evaluated values and uniformity for the generator and the discriminator to learn them separately.

FIG. 8C shows the distribution of chip characteristics based on the SIDD, Fmax and homogeneity of the original real wafer marked on the axes. FIG. 8D shows the distribution of chip characteristics based on SIDD, Fmax marked on the axes and uniformity before adding wafer process characteristics as evaluation parameters of chip characteristics. FIG. 8E shows the distribution of the chip characteristics based on the SIDD and Fmax marked on the axes and the uniformity after adding the wafer process characteristics as the evaluation parameters of the chip characteristics. Referring to FIG. 8E, it can be seen that at lower SIDD, the homogeneity distribution after adding the wafer process characteristics is closer to the homogeneity distribution of the original real chip characteristics distribution. FIGS. 8C, 8D, and 8E also show that the generator learns better in terms of uniformity after adding test sets with both evaluation values and uniformity characteristics for the generator and the discriminator to learn separately.

FIG. 9A is a schematic diagram of the three-dimensional surface distribution of the surface profile of the SIDD in accordance with an embodiment of the present invention. FIG. 9B is a schematic diagram of the curves of the number of qualified wafers under different frequency tests in accordance with an embodiment of the present invention.

Referring to FIG. 9A and FIG. 9B, in an example embodiment. 20 wafer images were sampled and averaged to show the distribution of SIDD surfaces and the corresponding qualified wafers. The results show that the SIDD surface distribution data maps corresponding to Fmax generated by the generator are similar to the chip characteristics data maps on real wafers. In other words, the data with the same SIDD value also has similar distribution on the wafer as the qualified wafer. Thus, the generator not only learns the distribution of the marked chip characteristics on the wafer surface, but also learns and predicts the distribution in higher dimensions (i.e., the distribution of qualified wafers on the pseudowafer image).

The described design circuit (integrated circuit) can be implemented as hardware using a hardware description language (such as Verilog HDL or VHDL) or another suitable programming language. Depending on the design requirements, the embodiment of the IC-assisted design method shown in FIG. 10 can be in the form of hardware, firmware, software, or a combination of more than one of the three. In the case of hardware, the functions of steps S1000 and/or S1020 shown in FIG. 10 can be implemented as logic circuits on an integrated circuit. The functions associated with Step S1000 and/or S1020 can be implemented in various logic blocks, modules, and circuits in one or more controllers, microcontrollers, microprocessors, ASICs, DSPs, FPGAs. and/or other processing units. In software form and/or firmware form, the functions associated with the above steps S1000 and/or S1020 can be implemented as programming codes. For example, the above steps S1000 and/or S1020 can be implemented using general programming languages (e.g., C, C++, or a combination of languages) or other suitable programming languages. The code can be recorded/stored in "non-transitory computer readable medium". A computer. Central Processing Unit (CPU), controller, microcontroller, or microprocessor may read and execute the programming code from the non-transitory computer readable medium. For example, processor 310 may read and execute the programming code from the non-temporary computer readable medium (e.g., database 320), thereby implementing the functions associated with steps S1000 and/or S1020 above.

In summary, the above-described embodiments use an integrated circuit process of a target line to fabricate one (or more) wafers 200, wherein each of the wafers 200 includes a plurality of wafers 210, and each of the wafers 210 includes at least one sensor 211. These chip characteristic values are used to model the chip characteristic distribution of the target line. Accordingly, different chip characteristic distribution models can be constructed for different lines. In the case where a designer intends to use a target line to manufacture an integrated circuit, the designer can use the chip characteristic distribution model associated with the target line to more accurately analyze the designed circuit (integrated circuit) during the circuit design phase to improve production yields.

Although the disclosure has been disclosed in the above embodiments, the above embodiments are not intended to limit the disclosure. Persons skilled in the art may make some changes and modifications without departing from the spirit and scope of the disclosure. Therefore, the protection scope of the disclosure shall be defined by the scope of the appended claims.

What is claimed is:

1. A semiconductor chip design device, comprising:
a database, having a first chip characteristic distribution image data generated based on a wafer process data of a current fabrication process, wherein the first chip characteristic distribution image data comprises a gradient distribution information of at least one chip characteristic of one wafer produced by the current fabrication process, and the gradient distribution information represents a gradient distribution of the at least one chip characteristic; and
a processor, coupled to the database, using a second chip characteristic image data generated based on the first chip characteristic distribution image data as a process reference data for predicting a future wafer fabrication process, and providing the process reference data to the current fabrication process for evaluating and correcting the first chip characteristic images.

2. The semiconductor chip design device according to claim 1, wherein the first chip characteristic distribution image data shows a correlation information between the chip characteristic and a chip position of the wafer.

3. The semiconductor chip design device according to claim 1, wherein the first chip characteristic distribution image data comprises an oscillation frequency data of an oscillator.

4. The semiconductor chip design device according to claim 1, wherein the first chip characteristic distribution image data comprises a static leakage current data of a transistor.

5. The semiconductor chip design device according to claim 1, wherein the processor calculates a real static leakage current of a semiconductor chip according to the first chip characteristic distribution image data, and analyzes a static power consumption of the semiconductor chip according to the real static leakage current.

6. The semiconductor chip design device according to claim 5, wherein the processor generates an equivalent static leakage current gradient distribution image data corresponding to a chip position of the wafer according to the first chip characteristic distribution image data to analyze a die-to-die characteristic gradient, and wherein the processor predicts a true static leakage current gradient according to the equivalent static leakage current gradient distribution image data.

7. The semiconductor chip design device according to claim 1, wherein the wafer comprises a plurality of chips, wherein one of the plurality of chips comprises at least one sensor, wherein each sensor is measured to obtain chip characteristic values according to corresponding chip positions of the wafer, and the chip characteristic values is used to construct the first chip characteristic distribution image data.

8. The semiconductor chip design device according to claim 7, wherein each sensor comprises:
a ring oscillator, wherein the chip characteristics values comprise an oscillation frequency value of the ring oscillator.

9. The semiconductor chip design device according to claim 7, wherein each sensor comprises:
a transistor, wherein the chip characteristics values comprise a static leakage current value of the transistor.

10. The semiconductor chip design device according to claim 7, wherein the chip characteristic values are used to construct a gradient surface, wherein a generative adversarial learning method generates the first chip characteristic distribution image data according to the gradient surface, and the first chip characteristic distribution image data is stored in the database.

11. The semiconductor chip design device according to claim 10, wherein the generative adversarial learning method comprises adding at least one additional chip characteristic value to the first chip characteristic distribution image data, wherein the at least one additional chip characteristic value comprises an evaluation value and a uniformity value.

12. The semiconductor chip design device according to claim 11, wherein the at least one additional chip characteristic value is translated into an image data with additional electrical characteristics as the first chip characteristic distribution image data, and the first chip characteristic distribution image data is stored in the database.

13. The semiconductor chip design device according to claim 10, wherein the generative adversarial learning method processes a data set having the first chip characteristic distribution image data in batches.

14. A semiconductor chip design method, comprising:
  providing a first chip characteristic distribution image data generated based on a wafer process data of a current fabrication process by a database, wherein the first chip characteristic distribution image data comprises a gradient distribution information of at least one chip characteristic of one wafer produced by the current fabrication process, and the gradient distribution information represents a gradient distribution of the at least one chip characteristic;
  using a second chip characteristic image data generated based on the first chip characteristic distribution image data as a process reference data for predicting a future wafer fabrication process, and providing the process reference data to the current fabrication process for evaluating and correcting the first chip characteristic images by a process; and
  using the second chip characteristic image data to analyze the semiconductor chip.

15. The semiconductor chip design method according to claim 14, wherein the first chip characteristic distribution image data shows a correlation information between the chip characteristic and a chip position of the wafer.

16. The semiconductor chip design method according to claim 14, wherein the first chip characteristic distribution image data comprises an oscillation frequency data of an oscillator.

17. The semiconductor chip design method according to claim 14, wherein the first chip characteristic distribution image data comprises a static leakage current data of a transistor.

18. The semiconductor chip design method according to claim 14, further comprising:
  calculating a real static leakage current of a semiconductor chip according to the first chip characteristic distribution image data; and
  analyzing a static power consumption of the semiconductor chip according to the real static leakage current.

19. The semiconductor chip design method according to claim 18, further comprising:
  generating an equivalent static leakage current gradient distribution image data corresponding to a chip position of the wafer according to the first chip characteristic distribution image data to analyze a die-to-die characteristic gradient; and predicting a true static leakage current gradient according to the equivalent static leakage current gradient distribution image data.

20. The semiconductor chip design method according to claim 14, further comprising:
  fabricating a wafer through a wafer fabrication process, wherein the wafer comprises a plurality of chips, wherein one of the plurality of chips comprises at least one sensor;
  measuring each sensor to obtain chip characteristic values according to corresponding chip positions of the wafer; and
  constructing the first chip characteristic distribution image data according to the chip characteristic values.

21. The semiconductor chip design method according to claim 20, further comprising:
  constructing a gradient surface by using the chip characteristic values;
  generating the first chip characteristic distribution image data according to the gradient surface by a generative adversarial learning method; and
  storing the first chip characteristic distribution image data in the database.

22. The semiconductor chip design method according to claim 21, wherein the generative adversarial learning method comprises adding at least one additional chip characteristic value to the first chip characteristic distribution image data, wherein the at least one additional chip characteristic value comprises an evaluation value and a uniformity value.

23. The semiconductor chip design method according to claim 22, further comprising:
  translating the at least one additional chip characteristic value into an image data with additional electrical characteristics as the first chip characteristic distribution image data; and
  storing the first chip characteristic distribution image data in the database.

24. The semiconductor chip design method according to claim 21, wherein the generative adversarial learning method processes a data set having the first chip characteristic distribution image data in batches.

25. A chip characteristic distribution model construction method, comprising:
  fabricating a wafer through a wafer fabrication process, wherein the wafer comprises a plurality of chips, wherein one of the plurality of chips comprises at least one sensor;
  measuring each sensor to obtain chip characteristic values according to corresponding chip positions of the wafer; and
  constructing a first chip characteristic distribution model according to the chip characteristic values,
  wherein the chip characteristic values comprise a first chip characteristic distribution image data based on a wafer process data of a current fabrication process,
  wherein the first chip characteristic distribution image data comprises a gradient distribution information of at least one chip characteristic of one wafer produced by the current fabrication process, and the gradient distribution information represents a gradient distribution of the at least one chip characteristic,
  wherein a second chip characteristic image data generated based on the first chip characteristic distribution image data is served as a process reference data for predicting a future wafer fabrication process.

26. The chip characteristic distribution model construction method according to claim 25, wherein the first chip characteristic distribution model shows a correlation information between the chip characteristic and a chip position of the wafer.

27. The chip characteristic distribution model construction method according to claim 25, wherein the first chip characteristic distribution image data shows a correlation information between the chip characteristic and a chip position of the wafer.

28. The chip characteristic distribution model construction method according to claim 25, wherein the first chip characteristic distribution image data comprises a static leakage current data of a transistor.

29. The chip characteristic distribution model construction method according to claim 25, wherein the first chip characteristic distribution image data comprises an oscillation frequency data of an oscillator.

30. The chip characteristic distribution model construction method according to claim 25, wherein each sensor comprises a transistor, and the first chip characteristic distribution image data comprises a static leakage current of the transistor.

31. The chip characteristic distribution model construction method according to claim 25, further comprising:

constructing a gradient surface by using the chip characteristic values;

generating the first chip characteristic distribution image data according to the gradient surface by a generative adversarial learning method; and storing the first chip characteristic distribution image data in the database.

32. The chip characteristic distribution model construction method according to claim 31, wherein the generative adversarial learning method comprises adding at least one additional chip characteristic value to the first chip characteristic distribution image data, wherein the at least one additional chip characteristic value comprises an evaluation value and a uniformity value.

33. The method for constructing a chip characteristic distribution model according to claim 32, further comprising:

translating the at least one additional chip characteristic value into an image data with additional electrical characteristics as the first chip characteristic distribution image data to construct the chip characteristic distribution model; and storing the first chip characteristic distribution image data in the database.

34. The method for constructing a chip characteristic distribution model according to claim 33, wherein the generative adversarial learning method processes a data set having the first chip characteristic distribution image data in batches.

* * * * *